United States Patent [19]

Kramer

[11] Patent Number: 4,536,203
[45] Date of Patent: Aug. 20, 1985

[54] PRESSURIZED HEAT TREATMENT OF GLASS-CERAMIC TO CONTROL THERMAL EXPANSION

[75] Inventor: Daniel P. Kramer, Dayton, Ohio

[73] Assignee: The United States of America as represented by the Department of Energy, Washington, D.C.

[21] Appl. No.: 602,035

[22] Filed: Apr. 19, 1984

[51] Int. Cl.$^3$ .............................................. C03C 27/02
[52] U.S. Cl. ........................................ 65/29; 65/32; 65/33; 65/59.22
[58] Field of Search ..................... 65/59.22, 32, 33, 29

[56] References Cited

U.S. PATENT DOCUMENTS

| 1,536,821 | 5/1925 | Devers | 65/33 X |
| 2,239,551 | 4/1941 | Dalton et al. | 65/33 |
| 2,876,596 | 3/1959 | Kessler, Jr. | 65/59.22 |
| 3,116,137 | 12/1963 | Vasilos et al. | 65/33 X |
| 3,145,090 | 8/1964 | Buckner et al. | 65/33 X |
| 3,201,266 | 8/1965 | MacDowell | 65/33 X |
| 3,247,293 | 4/1966 | Myerson | 264/16 |
| 3,410,674 | 11/1968 | Martin | 65/33 |
| 3,589,880 | 6/1971 | Clark | 65/18 |
| 3,768,990 | 10/1973 | Seilers | 65/18 |
| 3,854,919 | 12/1974 | Pirooz | 65/32 |
| 3,862,829 | 1/1975 | Brandmayr et al. | 65/32 |
| 4,414,282 | 11/1983 | McCollister et al. | 428/433 |

OTHER PUBLICATIONS

Bridgman et al., J. Applied Physics 24, No. 4, pp. 405-415, (Apr. 1953), "Effects of Very High Pressure on Glass".
Introduction to Ceramics, pp. 271-276, 2nd edition, W. D. Kingery et al., One-Component Phase Diagrams.

Primary Examiner—Arthur Kellogg
Attorney, Agent, or Firm—Armand McMillan; Albert Sopp; Judson R. Hightower

[57] ABSTRACT

A method of producing a glass-ceramic having a specified thermal expansion value is disclosed. The method includes the step of pressurizing the parent glass material to a predetermined pressure during heat treatment so that the glass-ceramic produced has a specified thermal expansion value. Preferably, the glass-ceramic material is isostatically pressed. A method for forming a strong glass-ceramic to metal seal is also disclosed in which the glass-ceramic is fabricated to have a thermal expansion value equal to that of the metal. The determination of the thermal expansion value of a parent glass material placed in a high-temperature environment is also used to determine the pressure in the environment.

4 Claims, 4 Drawing Figures

PRESSURIZED HEAT TREATMENT OF GLASS-CERAMIC TO CONTROL THERMAL EXPANSION

The U.S. Government has rights in this invention pursuant to Contract No. DE-AC04-76DP00053 between the United States Department of Energy and Monsanto Research Corporation.

FIELD OF THE INVENTION

The present invention relates generally to glass-ceramics and more particularly to the pressurization of the parent glass during heat treatment.

BACKGROUND OF THE INVENTION

The manufacture of glass-ceramics or semicrystalline ceramics involves the controlled crystallization of a parent glass by means of a special heat-treating process. In general, the process used to form a glass-ceramic consists of adding a nucleating or crystallization-promoting agent to a glass-forming batch, melting the batch and simultaneously cooling and shaping the glass melt into a glass body, and thereafter heat treating the glass shape pursuant to a specified time-temperature schedule. The special heat treatment results in the parent glass being converted into a body composed of fine-grained crystals randomly oriented and substantially uniformly dispersed throughout the glass matrix. The crystals comprise a major portion of the mass of the glass-ceramic. Glass-ceramics have found a number of uses due to the hardness, strength, resistance to thermal shock, resistance to strain, high softening point, and generally pleasing appearance exhibited by the glass-ceramic bodies produced. In addition, a number of conventional fashioning methods such as blowing, casting, drawing, pressing, or spinning can be used to fashion the glass ceramic while still a glass into a desired shape.

An example of the heat treating of a parent glass to produce a glass-ceramic body is disclosed in U.S. Pat. No. 3,201,266 (MacDowell). According to the disclosure of this patent, the crystalline phase or phases which are precipitated out of the glass during the heat-treating step directly influence the physical properties and characteristics of the glass-ceramic body. Another example of the classical method of using time-temperature to obtain a glass ceramic is disclosed in U.S. Pat. No. 3,410,674 (Martin). This patent concerns a process for producing seals, especially with materials having low thermal coefficients of expansion. Pressure is used to push a molten glass-ceramic between or onto a bonding surface. It has also been disclosed in U.S. Pat. No. 3,862,829 (Brandmayr et al) that the electrical properties of ferroelectric devitrifiable glass-ceramics are improved by subjecting the ceramics to inert gas pressures during formation.

The use of pressure in the formation of glass articles has also been disclosed in prior art. For example, in U.S. Pat. No. 3,145,090 (Buckner et al), temperature and pressure are applied to a molten glass to flow the glass into the desired shape without the devitrification which would occur if higher temperatures were used. In an article entitled "Effects of Very High Pressure on Glass" by P. W. Bridgman and I. Simon appearing in the *Journal of Applied Physics* Vol. 24, No. 4, April 1953, pages 405–413, it is mentioned that the thermal expansion of a glass may conceivably be affected by pressure. The use of forming pressures to control bubble formation in fused silica and ceramic materials is also disclosed in U.S. Pat. No. 3,247,293 (Myerson) and U.S. Pat. No. 1,536,821 (Devers).

The use of a hot pressing step in the formation of silica to obtain dimensional stability and to prevent the formation of cristobalite has been disclosed in U.S. Pat. No. 3,116,137 (Vasilos et al). In order to obtain desired optical properties in a ceramic, hot pressing can also be used as disclosed in U.S. Pat. No. 3,589,880 (Clark). A method for making heat-resistant transparent optical elements is also disclosed in U.S. Pat. No. 3,768,990 (Sellers et al) in which the optical element is subjected to high pressures.

The matching of the thermal expansion value of a glass to a metal to provide a good seal is disclosed in U.S. Pat. No. 2,234,551 (Dalton et al). According to the disclosure of this patent, where the glass for a mercury vapor light has a thermal expansion value significantly different from the thermal expansion value of the lead-in metal wire, a graded glass is used immediately adjacent to the metal wire. Thus, where the glass touches the metal wire, the thermal expansion value of the glass equals that of the metal wire. The thermal expansion value then varies regularly and continuously to a substantially different value at a distance from the metal wire.

SUMMARY OF THE INVENTION

The present invention is a method for producing a glass-ceramic which has a specified thermal expansion value. According to the method, during the conventional heat treatment of the parent glass, the parent glass is subjected to a predetermined pressure. As the thermal expansion value of the heat-treated glass-ceramic is determined by the pressure exerted on the parent glass during heat treatment, the predetermined pressure value is chosen in order to achieve the desired thermal expansion value. Preferably, the glass-ceramic material is isostatically pressed.

In accordance with the present invention, a method for forming a strong glass-ceramic to metal seal is also disclosed. Initially, the thermal expansion value of the metal is determined. The glass-ceramic is then fabricated to have a thermal expansion value equal to the thermal expansion value of the metal. As described above, this is accomplished by pressurizing the parent glass to a predetermined pressure during heat treatment so that the glass-ceramic produced has a desired thermal expansion value. Simultaneously, the glass-ceramic to metal seal is formed with the glass-ceramic and the metal having the same thermal expansion values so that a strong seal is achieved.

Also in accordance with the present invention, the relationship between the pressure during heat treatment and the thermal expansion value produced in a glass-ceramic is also used to determine pressure in a high-temperature environment. This is achieved by placing a sample of the parent glass in the environment to be measured and subsequently removing the sample of glass after heat treatment has occurred in the environment. By measuring the thermal expansion value of the sample of glass-ceramic produced, the pressure which was present in the environment can be determined. This method of determining pressure could be especially useful in hostile environments where normal pressure sensors cannot be used.

It is an advantage of the present invention that a desired thermal expansion value for a glass-ceramic is provided without compositional or time-temperature processing changes. This is particularly advantageous where compositional or time-temperature changes are not possible because of other considerations.

Other features and advantages of the present invention are stated in or apparent from a detailed description of presently preferred embodiments of the invention found hereinbelow.

DETAILED DESCRIPTION OF THE PREFERRED EMBODIMENTS

The processing of a parent glass into a glass-ceramic material typically consists of a heating or crystallization treatment during which small crystallites are first formed and subsequently grow. Because of the composition dependence of this process, only a limited range of glass compositions can be processed into a glass-ceramic. The present invention is a method of processing the parent glass into a glass-ceramic in order to obtain a desired thermal expansion property or crystalline phase in the glass-ceramic without compositional or crystallization cycle changes. It has been determined that the application of pressure to the parent glass during the heat treatment cycle greatly affects the thermal expansion properties of a resulting glass-ceramic.

Two parent glasses were studied during the course of experimentation for the present invention. These two glasses were LP-glass and S-glass. These are silicate glasses with lithia, alumina, soda, borate, and potash as major constituents. The main difference between the two glasses is the type of nucleating agent added to the composition. In the preparation of LP-glass, a small amount of lithium phosphate is added as a nucleating agent. S-glass is prepared with ammonium phosphate as a nucleating agent as shown in U.S. Pat. No. 4,414,282 (Example 1). The same techniques were used for melting and forming of the two different parent glasses.

In order to investigate the effect of pressure on the thermal expansion characteristics of a glass-ceramic, a small hot isostatic press was used. The hot isostatic press was able to maintain the required time-temperature conditions throughout the selected pressure cycle. In effect, the hot isostatic press used was able to control and monitor two different cycles: a time-temperature crystallization cycle and a pressure cycle.

Figure 1:
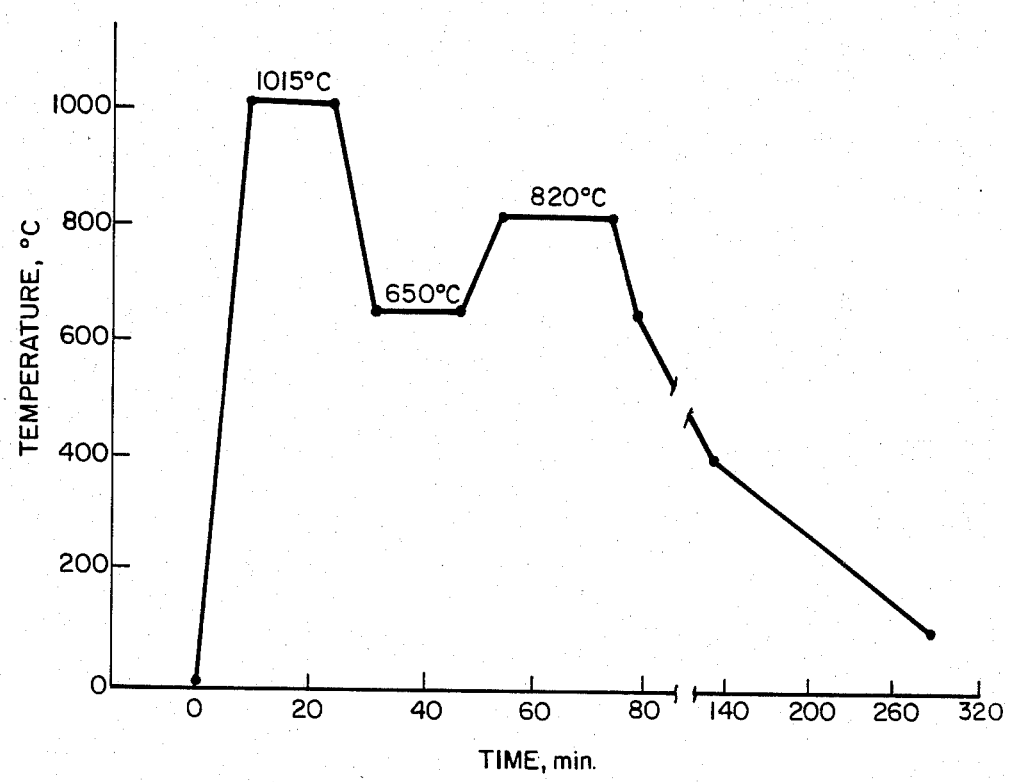
FIG. 1 is a graphical representation of the time-temperature crystallization profile which was used to form samples of a glass-ceramic according to the present invention.

The maximum pressure during the experiments was controlled by the introduction of argon into the pressure chamber at the start of the time-temperature crystallization cycle. The cycle which was used for all of the experimental runs is shown in FIG. 1. The purpose of the temperature hold at 650° C. is to help nucleate crystallites in the parent glass. The hold at 820° C. allows crystal growth, and hence the formation of the glass-ceramic. This is the type of cycle generally used in the fabrication of glass-ceramic components.

Figure 2:
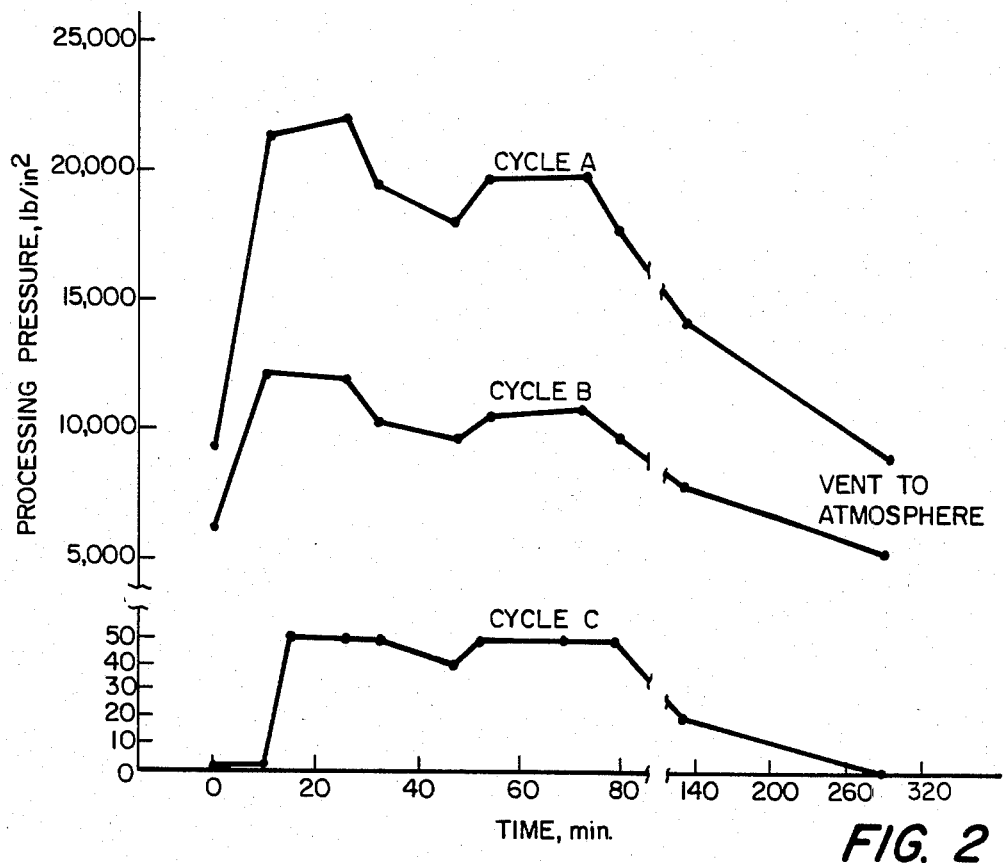
FIG. 2 is a graphical representation of the pressure cycles which existed for the three hot isostatic pressing runs during formation of the samples of the glass-ceramic according to the heat treatment depicted in FIG. 1.

Three different pressure cycles were studied in order to determine the effect of processing pressure on the properties of the glass-ceramics produced. Samples of the various parent glasses were processed using a maximum pressure of about 50 psi (cycle C), about 12,200 psi (cycle B), and about 22,000 psi (cycle A). The shape of the pressure cycle curves is depicted in FIG. 2 for the three pressure cycles. The shape of the pressure cycle curves is not straight since the pressure is dependent on the temperature in the test chamber. As shown in FIG. 2, the pressure rises and falls with the time-temperature profile depicted in FIG. 1. It should be appreciated that the processing cycle performed at the maximum pressure of 50 psi is a base-line run since this pressure is basically ambient.

Figure 3:
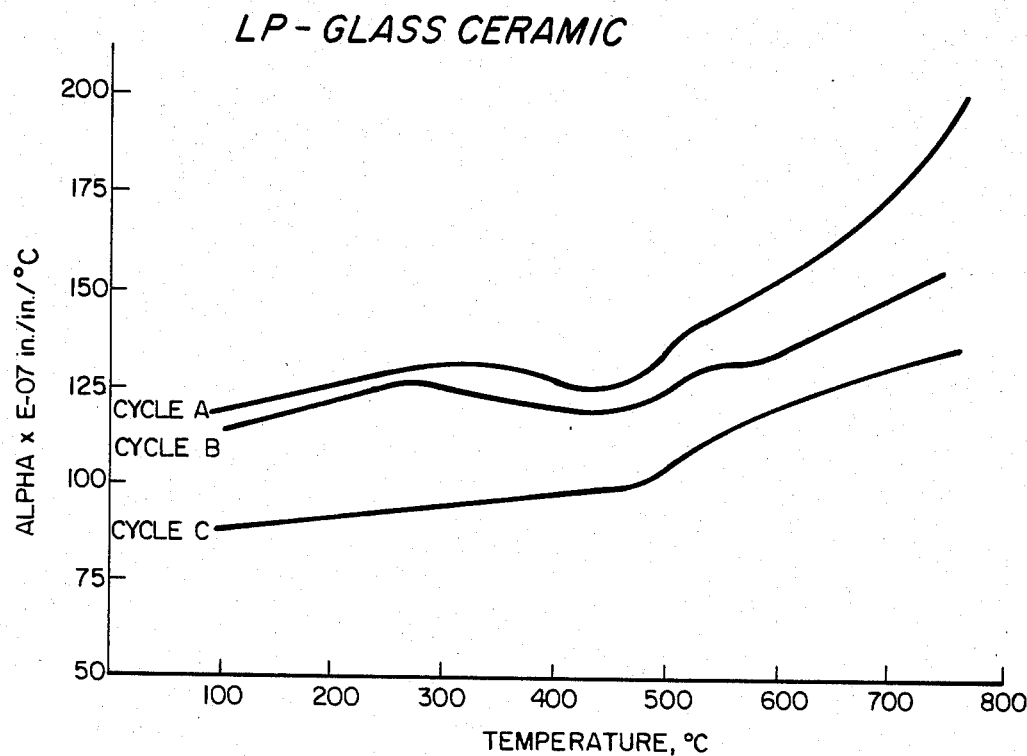
FIG. 3 is a graphical representation of the effect of processing pressure on the thermal expansion value (alpha) of an LP-glass-ceramic formed according to the heat treatment depicted in FIG. 1.
Figure 4:
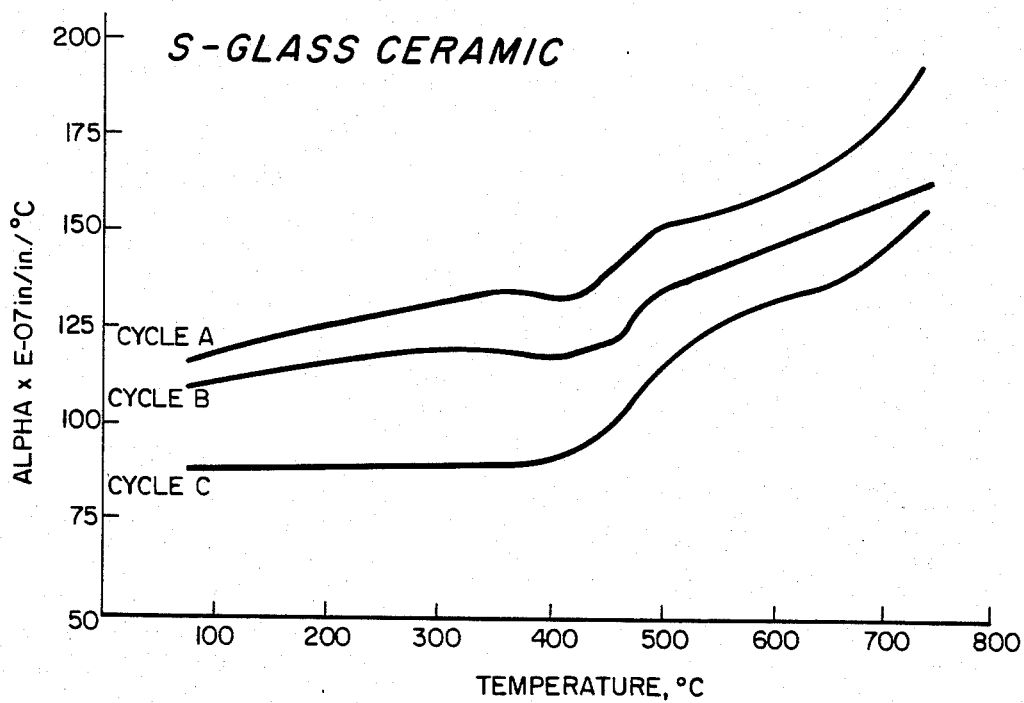
FIG. 4 is a graphical representation of the effect of processing pressure on the thermal expansion value of an S-glass-ceramic formed according to the heat treatment depicted in FIG. 1.

FIGS. 3 and 4 show the effect of pressure on the thermal expansion values of LP-glass and S-glass, respectively. These curves show that the application of pressure during the crystallization or heat treatment of the glass-ceramic significantly increases the thermal expansion values of the glass-ceramic produced. As much as a 50% increase in the thermal expansion of the glass-ceramic is obtained when the processing pressure is increased from 50 psi to 22,000 psi. Thus, an increase in maximum pressure resulted in an increase in the thermal expansion value of the resulting glass-ceramic. As shown, the samples ceramed during cycle A (maximum pressure 22,000 psi) had a higher thermal expansion value than those samples ceramed during cycle B (maximum pressure 12,200 psi), or cycle C (maximum pressure 50 psi).

It is believed that the increase in thermal expansion is a result of the enhanced crystallization of a high thermal expansion crystalline phase. The crystalline phase believed to be the primary cause of the increased thermal expansion is quartz.

As shown in FIGS. 3 and 4, the determination of the correspondence between pressure during heat treatment of a parent glass and the thermal expansion value of the produced glass-ceramic can be made for any particular parent glass. Once this is accomplished, it is then possible to produce a glass-ceramic from a parent glass having a specified thermal expansion value as desired. This is done by pressurizing the parent glass to a predetermined pressure during heat treatment corresponding to the desired thermal expansion value as read from a graph or chart similar to FIGS. 3 and 4. In this manner, a glass-ceramic is produced which has a chosen thermal expansion value.

The ability to produce a glass-ceramic having a chosen thermal expansion value is of particular utility in forming a strong glass-ceramic to metal seal. In order to accomplish this, initially the correspondence between pressure during heat treatment of a parent glass and the thermal expansion value of the produced glass-ceramic is determined such as shown in FIGS. 3 and 4. Next, the thermal expansion value of the metal is determined. The glass-ceramic is then fabricated to have a thermal expansion value equal to the thermal expansion value of the metal. As mentioned above, this is easily accomplished by pressurizing the parent glass to a pressure which is known to produce the desired thermal expansion value. The glass-ceramic to metal seal simultaneously formed is especially strong because the glass-ceramic and the metal have the same thermal expansion value.

The present invention can also be used as a type of pressure gauge, especially in environments which are hostile in terms of pressure and temperatures and where other pressure sensors cannot easily be used. Initially, the properties of a particular glass-ceramic fabricated at several elevated pressures is determined. From this information, a thermal-expansion versus processing-pressure curve is produced. For a particular time-temperature cycle, a small amount of the parent glass is then used as an indirect pressure indicator by placing the small parent glass sample in the test environment of interest. After the test is run, the parent glass sample is removed and the thermal expansion value for the glass-ceramic produced is determined. From the previously prepared curve of pressure versus thermal expansion, the pressure value to which the parent glass was subjected is easily obtained. For the formulated LP-glass described above, it is felt that the useful ranges for this type of sensor would be from 800° C. to 1,100° C. and at pressures from ambient to 22,000 psi. However, it should be appreciated that other parent glasses could be formulated to cover other ranges.

Although the present invention has been described with respect to exemplary embodiments thereof, it should be appreciated by those of ordinary skill in the art that variations and modifications can be effected within the scope and spirit of the invention.

I claim:

1. A method for producing a glass-ceramic having a specified thermal expansion value, comprising the steps of:
   initially determining the correspondence between pressure during heat treatment of a parent glass and the thermal expansion values of the glass-ceramics that result from said heat treatment carried out over a range of different pressure levels applied isostatically; and
   isostatically pressurizing the parent glass during heat treatment to a preselected pressure level within said range in order to obtain in glass-ceramic having the thermal expansion value corresponding to said pressure level.

2. A method for forming a strong glass-ceramic to metal seal, comprising the steps of:
   determining by the method of claim 1 the correspondence between pressure during heat treatment of a parent glass and the thermal expansion value of the resultant glass-ceramic;
   determining the thermal expansion value of the metal;
   fabricating by the method of claim 1 the glass-ceramic having a thermal expansion value equal to that of the metal and, simultaneously, forming a glass-ceramic to metal seal between the resultant glass-ceramic and the metal such that the glass-ceramic and the metal have the same thermal expansion values, whereby a strong seal is achieved.

3. A method of determining the pressure in a high-temperature environment, comprising the steps of:
   initially determining by the method of claim 1 the correspondence between pressure during heat treatment of a parent glass and the thermal expansion value of a glass-ceramic produced by the heat treatment;
   placing a sample of the parent glass in a high-temperature environment where the pressure is to be measured, so that the high temperature of the environment converts the parent glass sample into a sample of glass-ceramic, and subsequently removing the glass-ceramic sample so produced;
   measuring the thermal expansion value of the glass-ceramic sample; and
   determining the pressure which was present in the environment from the corresponding measured thermal expansion value of the sample of glass-ceramic.

4. A method for determining pressure as claimed in claim 3 wherein the parent glass is a silicate glass with lithium phosphate as a nucleating agent, wherein the temperature range in the environment is 800° C. to 1100° C., and the pressure measured is between ambient and 22,000 psi.

* * * * *